(12) United States Patent
Patterson et al.

(10) Patent No.: US 10,140,136 B2
(45) Date of Patent: Nov. 27, 2018

(54) DISTRIBUTED VIRTUAL ARRAY DATA STORAGE SYSTEM AND METHOD

(71) Applicant: Datrium, Inc., Sunnyvale, CA (US)

(72) Inventors: R. Hugo Patterson, Palo Alto, CA (US); Brian Biles, Palo Alto, CA (US); Boris Weissman, Palo Alto, CA (US); Ganesh Venkitachalam, Palo Alto, CA (US); Sazzala Reddy, Los Altos, CA (US)

(73) Assignee: Datrium, linc., Sunnyvale, CA (US)

( * ) Notice: Subject to any disclaimer, the term of this patent is extended or adjusted under 35 U.S.C. 154(b) by 245 days.

(21) Appl. No.: 13/998,531

(22) Filed: Nov. 7, 2013

(65) Prior Publication Data

US 2015/0127975 A1 May 7, 2015

(51) Int. Cl.
*G06F 11/00* (2006.01)
*G06F 9/455* (2018.01)
*G06F 11/10* (2006.01)

(52) U.S. Cl.
CPC ...... *G06F 9/45533* (2013.01); *G06F 11/1076* (2013.01)

(58) Field of Classification Search
CPC .............. G06F 11/1076–11/1096; G06F 2211/1002–2211/1095; G06F 9/45533
See application file for complete search history.

(56) References Cited

U.S. PATENT DOCUMENTS

| | | | |
|---|---|---|---|
| 6,704,730 B2 | 3/2004 | Moulton et al. |
| 7,373,464 B2 | 5/2008 | Zhu et al. |
| 7,434,015 B2 | 10/2008 | Zhu et al. |
| 8,285,918 B2 | 10/2012 | Maheshwari |

(Continued)

OTHER PUBLICATIONS

Edward K. Lee, et al., "Petal: Distributed Virtual Disks", Proceedings of the 7th International Conference on Architectural Support for Programming Languages and Operating Systems, Assocation for Computing Machinery, 1996, also SIGOPS Oper. Syst. Rev. 30, 5 (Sep. 1996), 84-92, downloaded Jun. 9, 2015 from http://www.thekkath.org/documents/petal.pdf.

(Continued)

*Primary Examiner* — Jason B Bryan
(74) *Attorney, Agent, or Firm* — Hickman Palermo Becker Bingham LLP (57) ABSTRACT

Embodiments of a distributed virtual array data storage system and method are disclosed. Storage nodes made up of relatively unsophisticated disks with associated processors are scalable to store very large amounts of data. The storage nodes communicate with servers directly over a network through, for example, an Ethernet connection. Control of the storage nodes and access to the storage nodes is handled entirely on the server side of the system by distributed virtual array (DVA) software running on the server side and employing a particular protocol over the standard network connection. In an embodiment, server-side virtual machine (VM) hosts host application VMs that are associated with vDisks. The DVA software distributes data for the vDisk over the storage nodes. In the case of failure of one or more of the storage nodes, the DVA software reconstructs the data, for example by reading redundant data from surviving storage nodes.

54 Claims, 10 Drawing Sheets

(56) References Cited

U.S. PATENT DOCUMENTS

| | | | | |
|---|---|---|---|---|
| 8,386,838 | B1* | 2/2013 | Byan | G06F 11/1484 714/5.11 |
| 8,601,473 | B1* | 12/2013 | Aron | G06F 9/45533 709/223 |
| 2005/0177770 | A1* | 8/2005 | Coatney | G06F 11/2092 714/15 |
| 2006/0161810 | A1* | 7/2006 | Bao | G06F 11/2082 714/6.12 |
| 2006/0218360 | A1* | 9/2006 | Burkey | H04L 67/1095 711/154 |
| 2009/0113420 | A1 | 4/2009 | Pawlowski | |
| 2009/0204846 | A1* | 8/2009 | Baloun | G06F 11/1076 714/6.12 |
| 2009/0292861 | A1 | 11/2009 | Kanevsky | |
| 2010/0106933 | A1 | 4/2010 | Kamila | |
| 2014/0208024 | A1* | 7/2014 | Simionescu | G06F 3/061 711/114 |
| 2014/0310332 | A1* | 10/2014 | Huang | H04W 4/60 709/203 |
| 2014/0380307 | A1* | 12/2014 | Zhu | G06F 9/45533 718/1 |

OTHER PUBLICATIONS

Chandramohan A. Thekkath, et al., "Frangipani: A Scalable Distributed File System", SIGOPS Oper. Syst. Rev. 31, 5 (Oct. 1997), 224-237, downloaded Jun. 9, 2015 from http://pdos.csail.mit.edu/6.824-2004/papers/thekkathfrangipani.pdf.

Brent Welch, et al., "Scalable Performance of the Panasas Parallel File System" 6th USENIX Conference on File and Storage Technologies (FAST '08), San Jose, California, Feb. 26-29, 2008, Jun. 23, 2011 Whitepaper version downloaded May 2015 from http://www.panasas.com/sites/default/files/docs/Panasas_Scalable_Storage_Arch_WP_1066.pdf.

Author unknown, "The Seagate Kinetic Open Storage Vision", web page description downloaded Jun. 10, 2015 from http://www.seagate.com/tech-insights/kinetic-vision-how-seagate-new-developer-tools-meets-the-needs-of-cloudstorage-platforms-master-ti/.

Frank Denneman, "Understanding the I/O Path of a Storage Acceleration Solution", PernixData online whitepaper downloaded Jun. 10, 2015 from http://pernixdata.com/sites/default/files/resources/Understanding_IO_Path_of_Storage_Acceleration_Whitepaper.pd.

Author unknown, "Nutanix Complete Cluster", Nutanix online whitepaper downloaded Jun. 10, 2015 from http://go.nutanix.com/rs/nutanix/images/WP_Nutanix_Complete_Cluster_Technical_Whitepaper.pdf.

Author unknown, "What's New: VMware Virtual SAN 6.0", VMware Storage Business Unit Documentation v1.0, Feb. 2015, VMware online whitepaper downloaded Jun. 10, 2015 from http://www.vmware.com/files/pdf/products/vsan/VMware_Virtual_SAN_Whats_New.pdf.

Mayur Dewaikar, "Symantec NetBackup PureDisk Optimizing Backups with Deduplication for Remote Offices, Data Center and Virtual Machines", 2009, Symantec online whitepaper downloaded Jun. 10, 2015 from http://eval.symantec.com/mktginfo/enterprise/white_papers/b-symantec_netbackup_puredisk_WP.en-us.pdf.

Alberto Miranda, et al., "Reliable and Randomized Data Distribution Strategies for Large Scale Storage Systems", HIPC '11 Proceedings of the 2011 18th International Conference on High Performance Computing, pp. 1-10, IEEE Computer Society, 2011, downloaded Jun. 13, 2015 from http://www.ssrc.ucsc.edu/Papers/miranda-hipc11.pdf.

Steven Byan et al., PAPER "Mercury: Host-side Flash Caching for the Data Center", April 20, 2012, http://storageconference.org/2012/Papers/04.Flash.1.Mercury.pdf.

Brent Welch el al., "Scalable Performance of the Panasas Parallel File System", May 2010, http://www.panasas.com/sites/default/files/uploads/docs/panasas_scalable_storage_arch_wp_1066.pdf.

Michael Eisler et al., "Data ONTAP GX: A Scalable Storage Cluste", FAST '07: 5th USENIX Conference on File and Storage Technologies, http://static.usenix.org/event/fast07/tech/full_papers/eisler/eisler.pdf.

S. Oehme et al., "IBM Scale out File Services: Reinventing Network-Attached Storage", Jul./Sep. 2008, http://www-935.ibm.com/services/us/its/pdf/sofs-am-journal-final-070108.pdf.

* cited by examiner

DISTRIBUTED VIRTUAL ARRAY DATA STORAGE SYSTEM AND METHOD

FIELD OF THE INVENTION

Embodiments are in the field of virtualized, scalable data storage for virtualized compute environments.

BACKGROUND

The need for efficient storage systems and methods for massive amounts of data continues to grow. Currently, large data centers commonly employ blade servers that access a storage system including scalable arrangements of physical shelves of memory devices (disks and/or flash) and storage controllers. Typically, the servers access the storage controllers over a network (Internet, local area network (LAN), storage area network (SAN), etc.), while the storage controllers communicate among themselves via a private backplane and communicate with memory via fibre channel or serial-attached SCSI. The use of virtual machines (VM) for server functions allows for dynamic allocation of hardware resources, and has become a characteristic of modern data centers. Another characteristic of modern data centers is the increased use of solid state drive (SSD) devices (e.g. Flash devices) for caching data at various points in the storage architecture to increase I/O operations per second (IOPS). While current storage architectures for VMs improve upon older designs, they retain some legacy characteristics that prevent these architectures from being optimally efficient, both in terms of cost and in terms of ease of use. For example, current storage systems must define an elaborate data storage structure (LUNs, Volumes, etc.). Some current systems also require a layer of software to translate multiple transfer protocols into one proprietary protocol (see for example, SpinNP, and NetApp).

Figure 1:
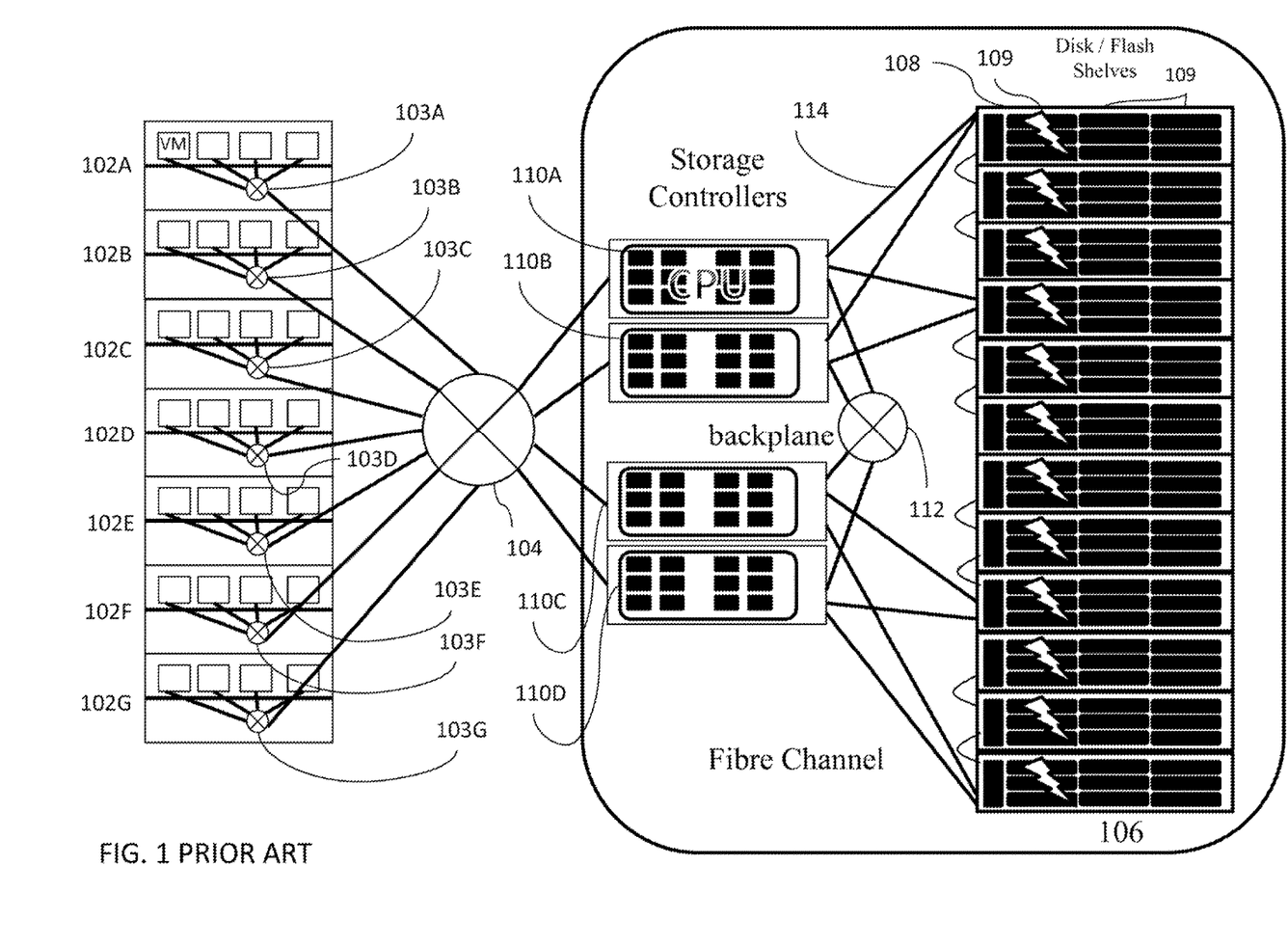
FIG. 1 is a block diagram of a prior art data storage system.

FIG. 1 is a block diagram of a prior art data storage system 100. There are multiple servers 102A-102G on the "server side". Each of the servers 102 hosts multiple virtual machines (VMs) that communicate with each other and with a network 104 via a driver 103. A VM comprises virtual versions of the standard components of a physical machine (not shown). These may include a virtual CPU, virtual RAM, and a virtual disk drive. The VM host stores the data associated with a virtual disk drive in a file referred to as a vDisk. These vDisks are stored in the physical storage 106 (right side of the diagram). In storage 106, dedicated storage controllers 110A-110D handle communications from the server side via a standard network interface. Then the storage controllers 110 access physical storage nodes 108 via fibre channel. The storage controllers also communicate with each other via a dedicated backplane 112. System 100 includes disk devices 111 and Flash devices 108. The Flash devices may be used as either a fast tier of storage or as a cache. In either case, because the flash must be accessed via the network 104 and fibre channel 114 (using various protocols), there can be additional access latency attributable to this architecture.

In order for large scale data storage to truly migrate to a virtualized networked environment, it is desirable to have a storage system and method that includes a single, large, relatively inexpensive storage pool accessed directly over a network and managed remotely over the network by server-side compute servers or VMs. It is also desirable to have a storage system and method that employs server-side Flash memory optimally for enhanced performance.

DETAILED DESCRIPTION

Embodiments of a distributed virtual array data storage system and method are disclosed. Storage nodes made up of relatively inexpensive disks with associated processors are scalable to store very large amounts of data. The storage nodes communicate with servers directly over a network through, for example, an Ethernet connection. Control of the storage nodes and access to the storage nodes is handled entirely on the server side of the system by distributed virtual array (DVA) software running on the server side and employing a particular protocol over the standard network connection. The DVA software facilitates all data access functions for applications running on the servers, as well as all data maintenance functions such as disk reconstruction, garbage collection, etc.

Figure 2:
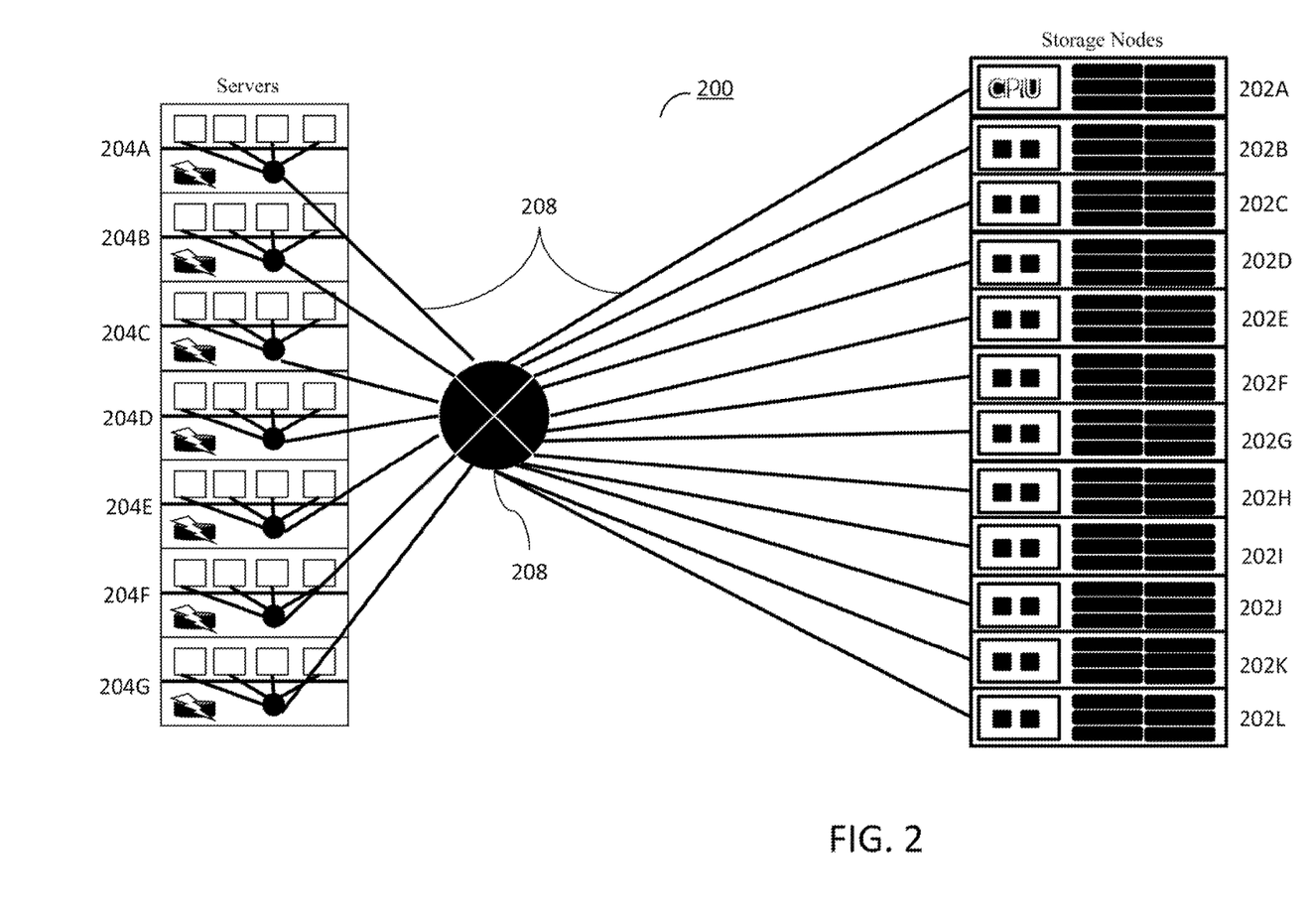
FIG. 2 is a block diagram of a data storage system according to an embodiment.

FIG. 2 is a block diagram of a data storage system 200 according to an embodiment. System 200 includes multiple servers 204A-204G on the server side, and multiple simple storage nodes 202A-202L on the storage side. The actual numbers of servers and storage nodes shown is arbitrary and chosen for example only. There could be typically many more servers and many more storage nodes. In addition, the system 200 is scalable by adding elements such as servers and storage nodes.

As shown in greater detail in further figures, each server 204 (also referred to as a VM host) hosts multiple VMs, a driver (also referred to as a host driver), and a Flash memory component usable for server-side cache. In an embodiment, the servers are ESX™ blade servers available from VMware™ but the invention is not so limited. Each server also runs distributed virtual array (DVA) software as further described below. The DVA software (not shown) can run on a VM host as a driver in the kernel. The DVA software can also run as a user-level program. The DVA software can run in a VM on the host, or inside each guest VM, or the DVA software may be distributed across the server side in any manner. The server drivers communicate via network 206, which is this example is the Internet, but could also be any network with sufficient data capacity. The storage nodes 202 also communicate directly with the network 206 through standard network connections 208 (for example Ethernet). Each storage node 202 includes a central processing unit (CPU) and multiple physical disks.

Figure 3:
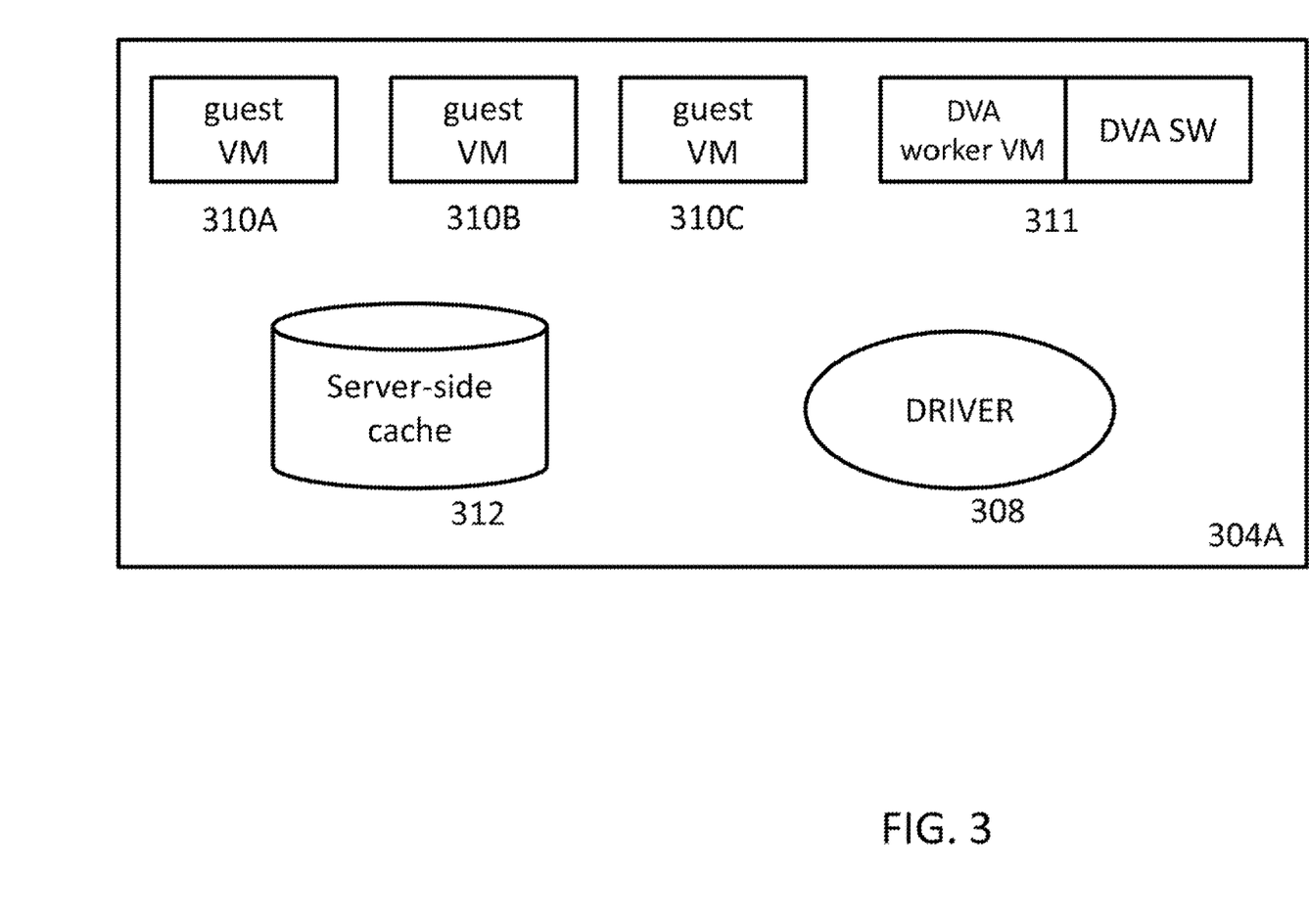
FIG. 3 is a block diagram of one server of multiple servers according to an embodiment.

FIG. 3 is a block diagram of one server 304A of multiple servers according to an embodiment. Server 304A includes Flash memory device for server-side cache 312 (also referred to as local cache), and multiple guest VMs 310A-310C and a driver 308. In various embodiments, server-side cache 312 could alternatively be any appropriate type of memory device for the purpose, such as any solid state memory device, including without limitation Flash, phase-change random access memory (PRAM), etc., and it could be packaged as a Solid-State Disk (SSD), a circuit card plugged into a bus within the server, or included as a module on the server motherboard. Server 304A also includes a DVA worker VM 311 that runs the DVA software 313. DVA software 313 handles all storage-related functions for the guest VMs, which are also referred to as application VMs. The DVA software may implement a file system for the storage of vDisks. The file system may be a block-addressed file system, a content-addressed deduplicating file system, a log-structured file system, or any other type of suitable file system. The DVA software handles reads and writes and other functions on the data path and also performs background storage management functions, such as background reconstruction of entire disks, scrubbing, garbage collection, rebalancing, migration, etc. In other embodiments, the server hosts multiple worker VMs, and these worker VMs cooperate to perform the DVA process including, the background storage management functions, for multiple vDisks. At times there may be vDisks that are not in use by any VM host. In an embodiment, such unused vDisks are reconstructed cooperatively by the multiple worker VMs.

Figure 4:
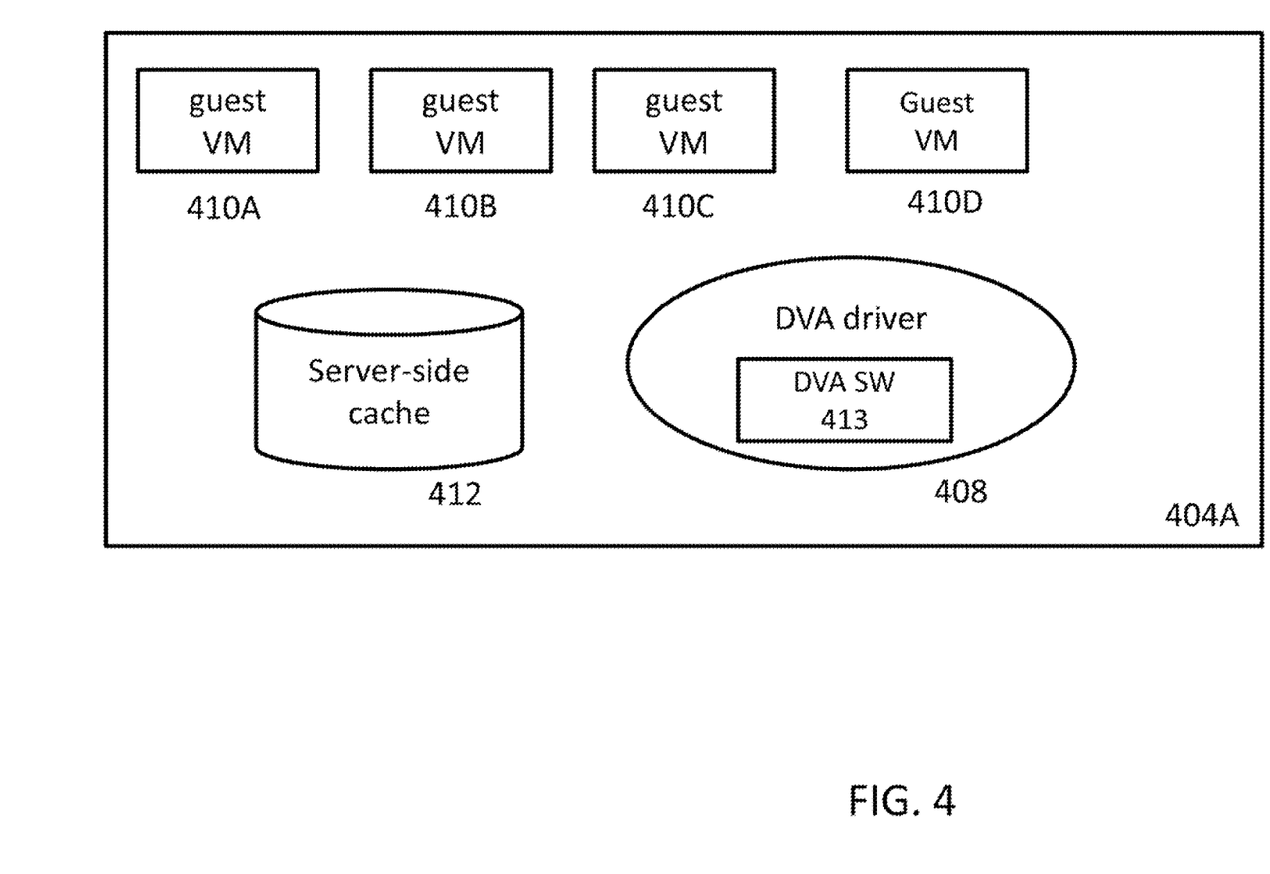
FIG. 4 is a block diagram of one server of multiple servers according to an embodiment.

FIG. 4 is a block diagram of one server 404A of multiple servers according to an embodiment. Server 404A is an example of one of many alternative arrangements to the arrangement of server 304A. Server 404A includes server-side cache 412, multiple guest VMs 410A-410D and a DVA driver 408. DVA driver 408 runs the DVA software 413. DVA software 413 handles all storage-related functions for the VMs 410.

FIGS. 3 and 4 show example alternative arrangements for running the DVA software. As previously states, the DVA software can run on a VM host as a driver in the kernel. The DVA software can also run as a user-level program. The DVA software can run in a VM on the host, or inside each guest VM, or the DVA software may be distributed across the server side in any manner. As such, the storage-related functions for all vDisks in the system are distributed across the server side in any manner.

Figure 5:
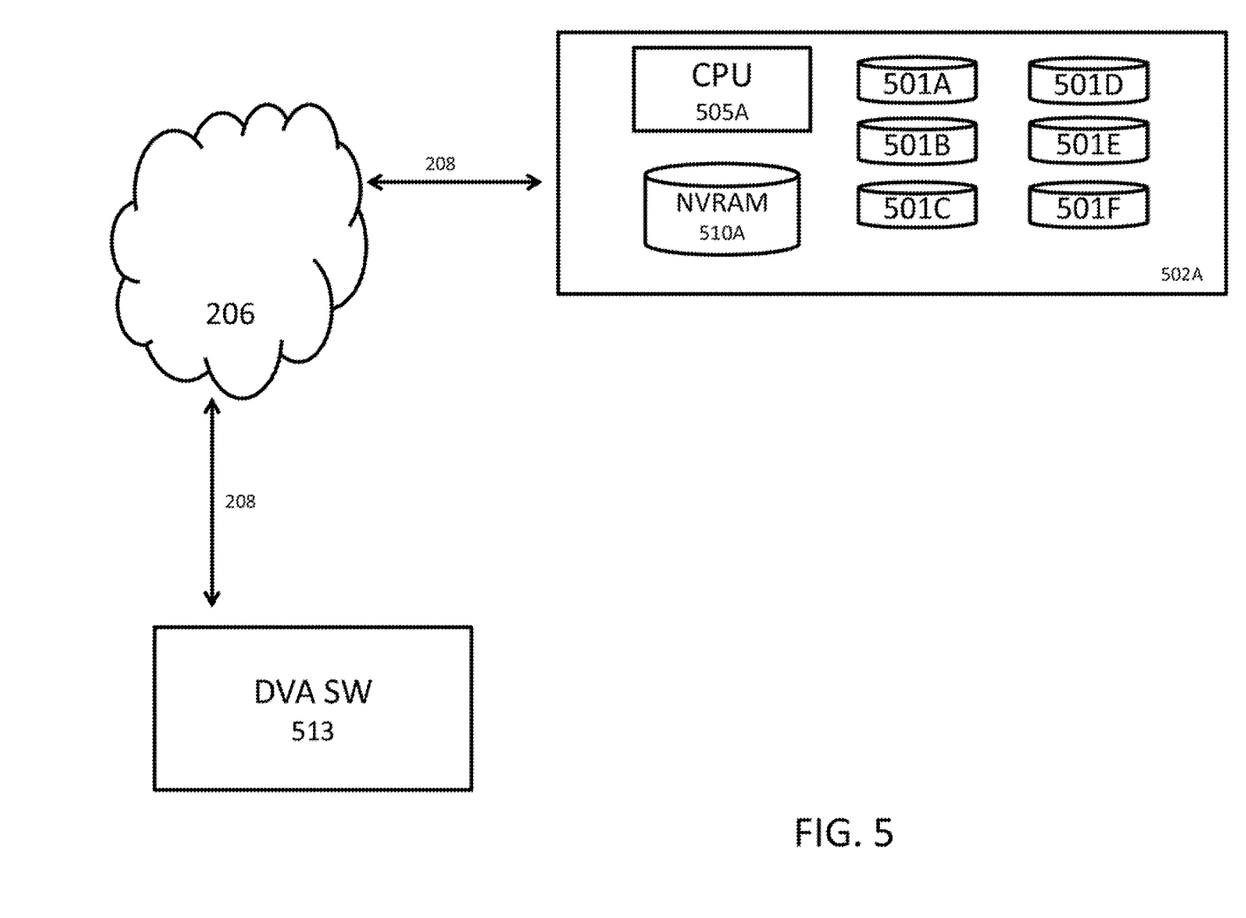
FIG. 5 is a block diagram of one storage node of multiple storage nodes according to an embodiment.

FIG. 5 is a block diagram of one storage node 502A of multiple storage nodes according to an embodiment. The storage node 502A includes multiple disks 501A-501F and a standard CPU 505. Multiple disks 501A-501F are examples of physical data storage devices. There can be any number of disks in a storage node 501. Six disks 501 are shown as an example. Disks 501 themselves can be any appropriate type of physical storage device. In an embodiment, storage node 502A also includes non-volatile random-access memory (NVRAM) 510. NVRAM devices retain stored data when the power is lost, and have relatively low latency on write operations. According to embodiments of a DVA data layout scheme, each VM host compute server 204 writes to disjoint sets of physical stripes across disks 501. Also, new Write data is stored to the NVRAM 510 of at least one of the storage nodes 502 so that if there is a power failure, a copy of the new Write data survives. New Write data can also be stored to the NVRAM 510 of at least two storage nodes 502, so that if one node fails there is a redundant copy of the new Write data. According to an embodiment, the DVA method includes storing new Write data for at least one vDisk to at least one storage node so that if the VM host compute server fails, a copy of the newly written data survives on that storage node. New Write data can also be buffered in the VM host until there is enough data to write a full stripe of new data to storage nodes. New Write data can be buffered on the VM host for even longer periods to give time for later overwrites of the same location in a vDisk to obviate the need to write out the overwritten data in a stripe. Embodiments of the DVA method also include a writing VM host compute server computing at least one erasure coded block for a full stripe of data, and writing the at least one erasure coded block to a storage node.

The CPU 505 performs functions on the disks 501 as directed by the DVA software 513 via the network 206 over a standard network connection 208. For purposes of embodiments described herein, the DVA software 513 could be running anywhere on the server side. However, the DVA software 513 is not envisioned running on the storage side, for example in the CPU 505, as long as there are servers available to run the software. The relative simplicity of the storage nodes makes the storage nodes inexpensive, eliminates the need for dedicated backplanes and fibre channel connections on the storage side, and allows the entire storage side to communicate with the server side directly via a standard network connection. In various embodiments, the storage nodes are not configured to host VMs, at least in part because such a capability is never needed. In various embodiments, the storage nodes are not capable of hosting VMs, at least in part because the inexpensive storage CPUs are not sufficiently powerful to host VMs.

Figure 6:
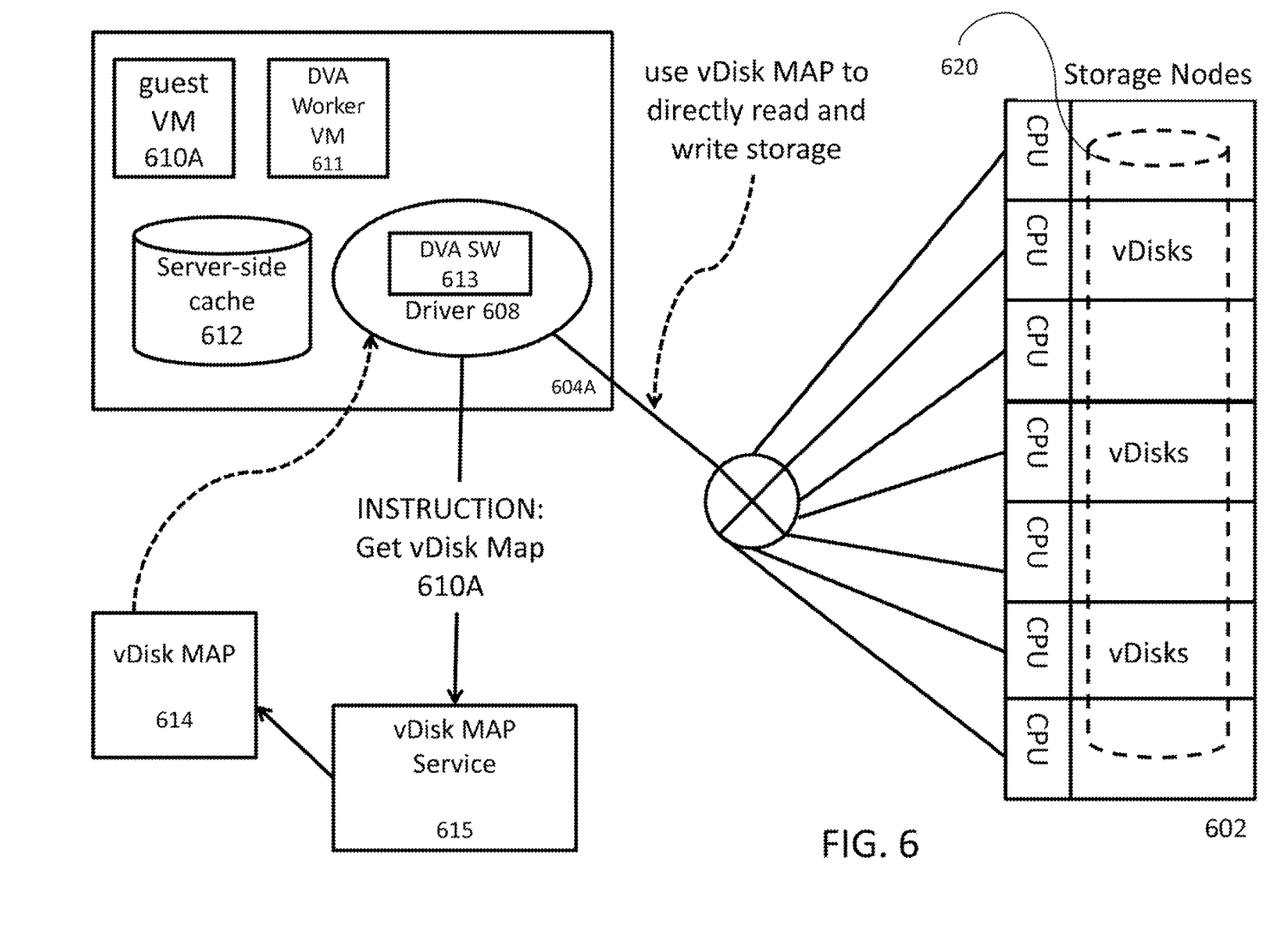
FIG. 6 is a block diagram illustrating a virtual disk arrangement for an application VM according to an embodiment.

FIG. 6 is a block diagram illustrating a virtual disk arrangement for an application VM according to an embodiment. One server 604A is shown as an example in this figure. The server 604A has a driver 608 and a guest VM 610A. The server 604A in the embodiment shown has the DVA software 613 running in the driver and also a DVA worker VM 611 for running background storage management functions, but as previously described, other arrangements are practicable. Server-side cache 612 is also available to guest VM 610A. When guest VM 610A first begins operating, or makes its first storage request, DVA software 613 in driver 608 acquires a vDisk map specific to a vDisk defined for the guest VM 610A. Storage nodes 602 store multiple vDisks 620 distributed across the multiple physical disks and managed from the server side by the DVA software. Data can be stored in any known manner including storing the data as erasure coded blocks such as parity blocks, Reed-Solomon coded blocks, or Huffman encoded blocks.

As previously stated, storage control and management occurs from the server, and on initial storage access the server needs to know the appropriate vDisk map for the requesting guest, or application VM. In an embodiment, the driver requests the vDisk map from a vDisk map service 615 which stores the vDisk map 614. This transaction occurs only once on startup of the application. Thereafter, the driver 608 uses the vDisk map to access the appropriate vDisk(s) directly over the network via the standard network connection 208, including Read and Write operations and storage maintenance operations.

In various embodiments, the vDisk map can be stored anywhere on the system. In various embodiments, the vDisk map service executes on the storage nodes, other dedicated controller nodes, one or more of the VM hosts, or some combination of those.

Figure 7:
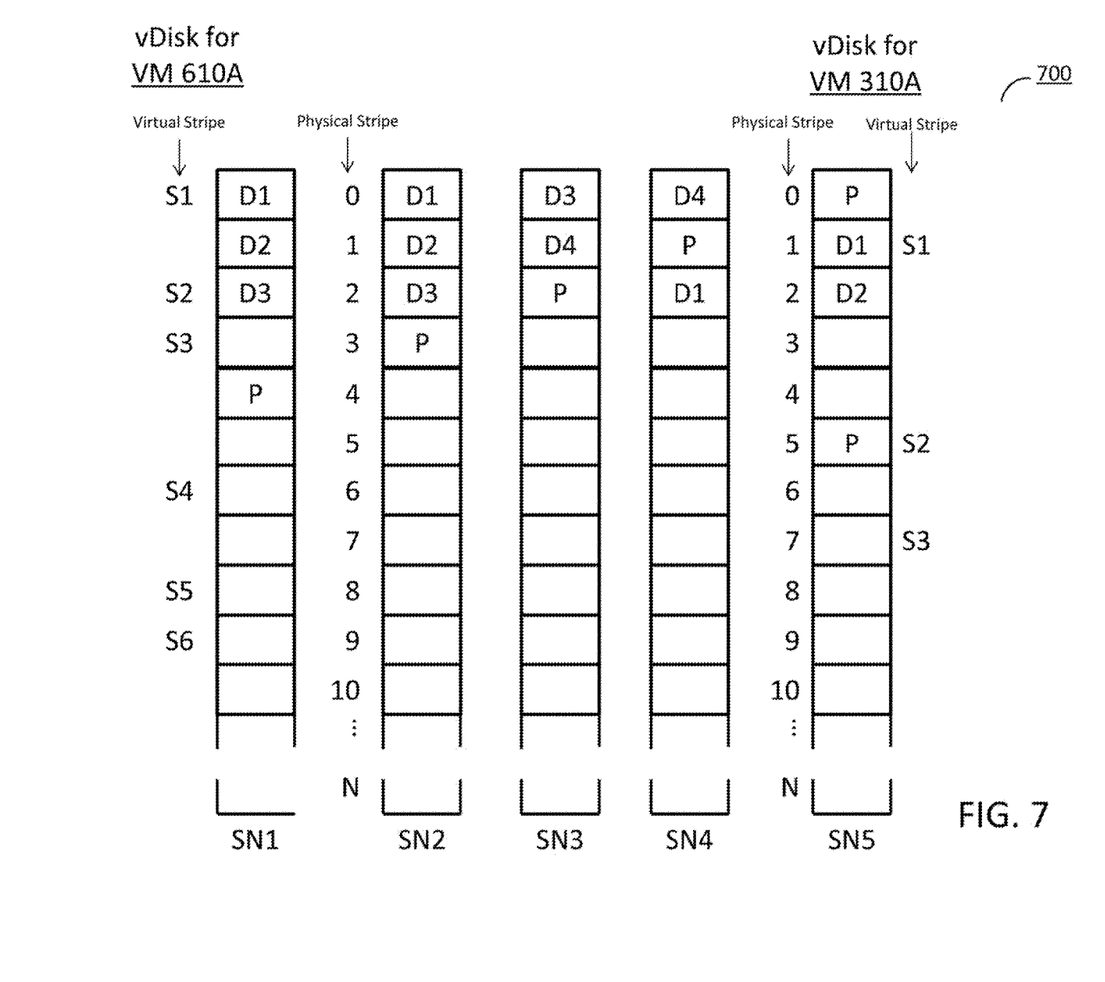
FIG. 7 is a block diagram illustrating a virtual-disk-to-physical-disk mapping arrangement according to an embodiment.

FIG. 7 is a block diagram illustrating a virtual-disk-to-physical-disk mapping arrangement 700 according to an embodiment. This arrangement is an example, and is not meant to be exclusive of other mapping arrangements or schemes. In this example, a RAID 5 scheme is used. There are five storage nodes SN1-SN5. Data blocks are striped across the storage nodes as shown. For example, a first physical stripe 0 (reading from left to right) includes data blocks D1, D2, D3, D4, and one parity block P. The maps for two vDisks are shown as examples. vDisk 610A (corresponding to VM 610A is shown on the far left, and vDisk 310B is shown on the far right.

Figure 8:
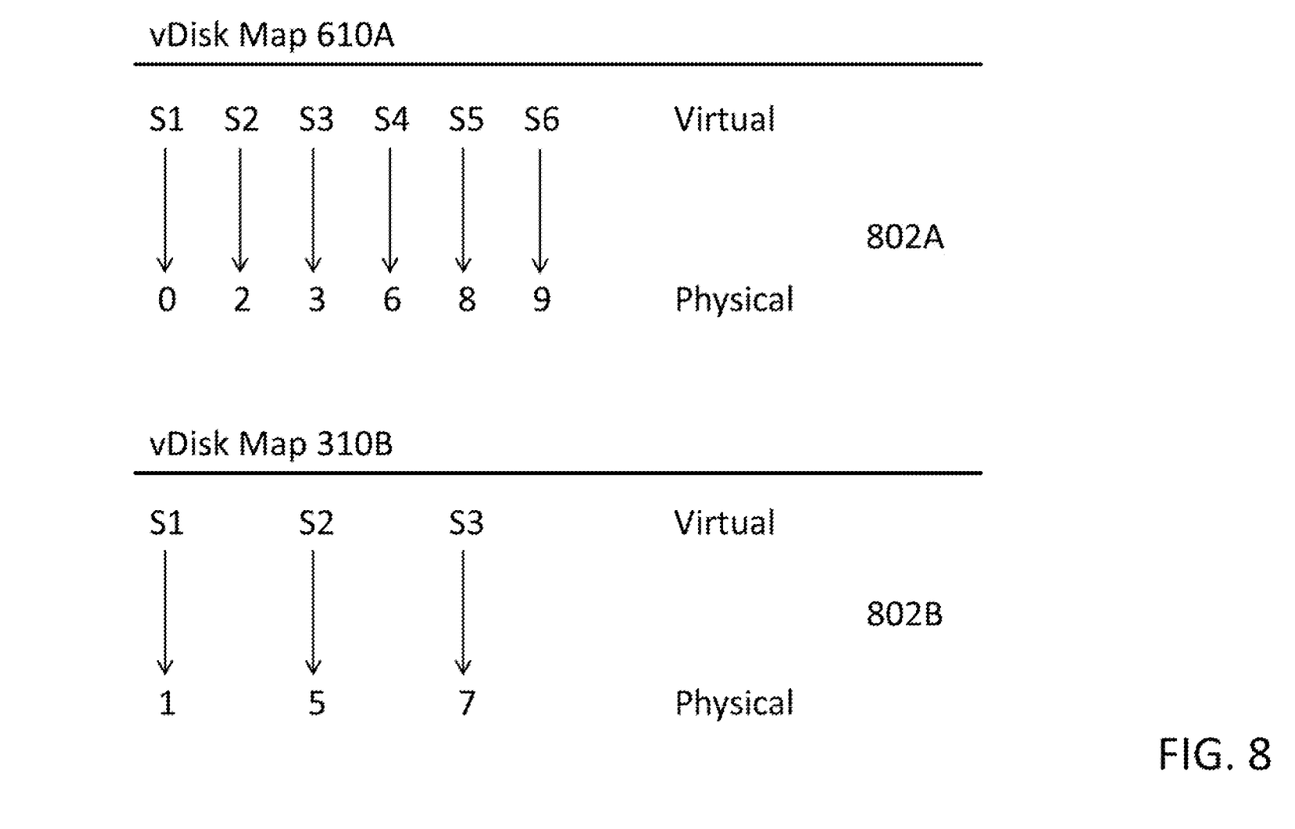
FIG. 8 is a block diagram of vDisk maps according to an embodiment.

In the case of failure of one of the storage nodes, the DVA software reconstructs the missing data. For example, if an attempt to read from data block D3 from vDisk 610A (in virtual stripe S1, physical stripe 0) fails, D3 can be recovered by reading D1, D2, D4 and the parity block and XORing these together. The DVA software also updates the parity block. Any other known methods for data redundancy and data reconstruction are also contemplated for embodiments. The system can employ other RAID schemes, such as RAID 6 for example, or data mirroring. Referring to FIG. 7 and also FIG. 8, the vDisk maps for vDisks for VM 610A and VM 310B are shown. The virtual data stripes for the vDisk for VM 610A are S1, S2, S3, S4, S5, and S6. The corresponding physical stripes are 0, 2, 3, 6, 8, and 9, respectively. The virtual data stripes for the vDisk for VM 310B are S1, S2, and S3. The corresponding physical stripes are 1, 5, and 7, respectively. In an embodiment, one VM owns a set of physical stripes (for WRITE access) with no common ownership among different VMs. Once VM 310B is assigned physical stripe S1, for example, no other VM can write to stripe S1, but any VM can read from it. In this way, VMs do not need to communicate with each other or cooperate in any way to access storage. For example, if multiple VMs had access to the same data stripe, the parity block must reflect updates made by all of the VMs. This would necessitate a scheme for data coherency such as checking out stripe locks to VMs, etc. By assigning physical data stripes to VMs on an exclusive basis, these data coherency concerns are obviated. Also, because VMs do not need to communicate with each other regarding storage accesses, potential latencies due to VMs being busy with non-storage related tasks are also avoided.

Figure 9A:
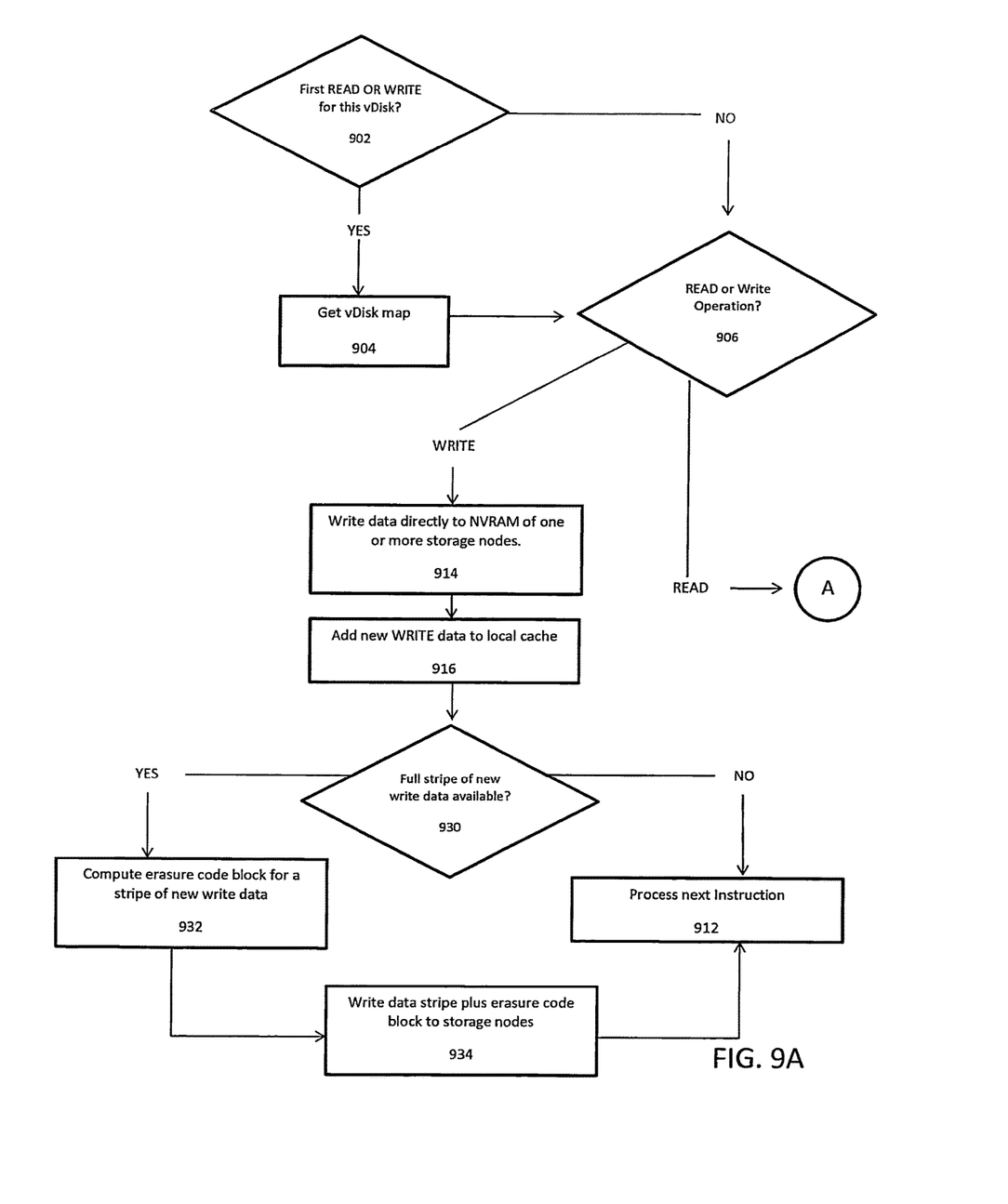
FIGS. 9A and 9B are a flow diagram illustrating a method for a driver to access data storage according to an embodiment.
Figure 9B:
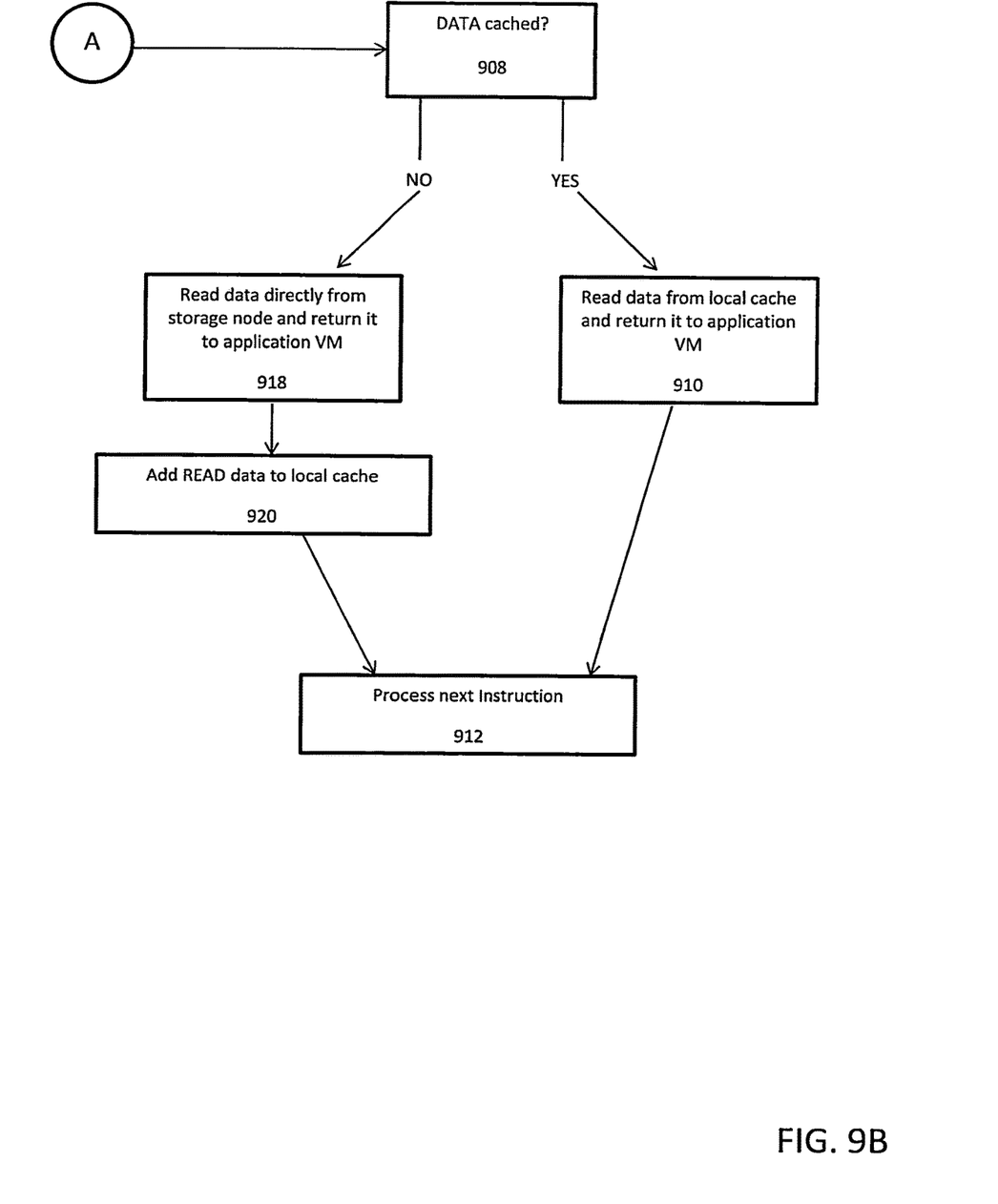

FIGS. 9A and 9B are a flow diagram illustrating a method for a host driver to access data storage according to an embodiment. The driver determines at 902 whether a request for a storage access operation (typically or Read or Write operation) is the first one for this vDisk. If it is the first request, the driver obtains the vDisk map from the vDisk map service (904). Then it is determined (906) whether the operation is a READ or WRITE operation. This sequence is shown as an example. It is also possible to determine the type of operation before it is determined whether the operation is the first storage access request for the application. If it is not the first request, the process determines (906) whether the operation is a READ operation or a WRITE operation.

If the operation is a WRITE, data is written directly to the NVRAM of one or more of the storage nodes (914). Then new Write data is written to the local cache (916). If a full stripe of Write data is available (930), then an erasure code block is computed for the stripe of new Write data (932), and the Write data plus the erasure code block is written to one or more storage nodes (934). If a full stripe of Write data is not available at 930, new Write data can be buffered in the VM host until there is enough data to write a full stripe of new data to storage nodes. It is also possible to wait longer before writing the stripe to give time for overwrites to obviate the need write out some data in a stripe. The process then moves to the next instruction at 912.

Referring to FIG. 9B, if the operation is a READ, the data is looked up in the cache at 908. If the data is cached, it is read from the cache and returned to the VM that is running the requesting application (the application VM) at 910. If the data is not cached, it is read directly from the storage node using the vDisk map, and returned to the application VM (918). The READ data is also written to the local cache (912), and the system is ready to process the next instruction (912).

Aspects of the systems and methods described herein may be implemented as functionality programmed into any of a variety of circuitry, including programmable logic devices (PLDs), such as field programmable gate arrays (FPCAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description. In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. A data storage system, the system comprising:
a plurality of storage nodes, each comprising:
one or more storage devices,
a central processing unit (CPU), and
a memory configured such that data stored therein is not lost in the case of power failure;
at least one VM host compute server;
wherein the at least one VM host compute server includes a VM host compute server that:
is coupled, through a network, directly to the plurality of storage nodes,
is hosting at least one guest VM with access to at least one virtual disk (vDisk),
comprises at least one server-side cache that is available to each of the at least one guest VMs, and
is programmed with particular instructions which, when executed by the VM host compute server, cause write data to be written at least three times in response to a write operation performed by the at least one guest VM to the at least one vDisk;
wherein the at least three times includes:
before a triggering event occurs:
writing the write data to the memory, of at least one of plurality of storage nodes, that is configured such that data stored therein is not lost in the case of power failure; and
writing the write data to the at least one server-side cache;
after the triggering event occurs:
generating a full stripe of data that includes the write data; and
writing the full stripe of data to distribute the full stripe of data across storage devices of one or more of the plurality of storage nodes;
wherein the triggering event is that the VMhost compute server has accumulated sufficient write data, which has not yet been written in a full stripe, to generate a full stripe of data.

2. The system of claim 1, wherein the VM host compute server is programmed with instructions which, when executed, cause:
in a case of failure of a component of a particular storage node that includes a portion of the full stripe of data, reconstructing missing data that corresponds to the portion of the full stripe by reading redundant data from one or more surviving storage nodes, of the plurality of storage nodes.

3. The system of claim 2, wherein the component that fails is a CPU and no data storage devices in the particular storage node are accessible.

4. The system of claim 2, wherein the redundant data comprises a plurality of mirrored copies.

5. The system of claim 2, wherein the redundant data comprises a plurality of erasure coded blocks.

6. The system of claim 5, wherein the redundant data comprises at least one of parity blocks, Reed-Solomon coded blocks, and Huffman encoded blocks.

7. The system of claim 1, wherein the VM host compute server comprises a driver that executes the particular instructions.

8. The system of claim 1, wherein the VM host compute server comprises a worker VM that executes the particular instructions.

9. The system of claim 1, wherein the VM host compute server comprises a user-level process executing the particular instructions.

10. The system of claim 1, wherein the at least one VM host compute server comprises software for performing background storage management functions for vDisks, wherein the functions comprise at least one of:
disk reconstructing;
data scrubbing;
data verification;
garbage collection;
data rebalancing; and
data migration.

11. The system of claim 1, wherein each of a plurality of VM host compute servers hosts software configured to cooperate with other VM hosts to perform background storage management functions for vDisks, wherein the functions comprise at least one of:
disk reconstructing;
data scrubbing;
data verification;
garbage collection;
data rebalancing; and
data migration.

12. The system of claim 1, wherein the at least one VM host compute server comprises a plurality of hosted VMs, each of which is associated with a vDisk, wherein each of the VMs is configured to reconstruct the data for its associated vDisk.

13. The system of claim 1, further comprising at least one storage device local to the at least one VM host compute server and accessible for caching data used by the guest VMs and their associated vDisks.

14. The system of claim 13, wherein the at least one server-side cache comprises a solid state drive (SSD) device.

15. The system of claim 13, wherein the at least one server-side cache comprises a Flash memory device.

16. The system of claim 13, wherein the at least one server-side cache comprises a phase-change random access memory (PRAM) device.

17. The system of claim 1, wherein the at least one guest VM is associated with the at least one vDisk, and wherein the particular instructions include instructions for autonomously reconstructing data on a failed storage node within the associated vDisk without communication to other VM hosts.

18. The system of claim 1, wherein the particular instructions further comprise instructions for each VM host compute server writing to disjoint sets of physical stripes based on a data layout scheme.

19. The system of claim 18, wherein the particular instructions further comprise instructions for allowing read access by other VM host compute servers to data written by one VM host compute server to storage node locations not writable by the other VM host compute servers.

20. The system of claim 18, wherein the particular instructions further comprise instructions for migrating the at least one guest VM to a different VM host compute server and providing the at least one guest VM access to its associated vDisk from the different VM host compute server.

21. The system of claim 1, wherein each of the plurality of storage nodes comprises non-volatile random access memory (NVRAM) for accepting Write data with low latency.

22. The system of claim 21, wherein the particular instructions further comprise instructions for storing new Write data to the NVRAM of at least one storage node such that if there is a power failure, a copy of the new Write data survives.

23. The system of claim 21, wherein the particular instructions further comprise instructions for storing new Write data to the NVRAM of at least two storage nodes such that if one node fails there is a redundant copy of the new Write data.

24. The system of claim 1, wherein the particular instructions further comprise instructions for storing new Write data for at least one vDisk to at least one storage node so that if the VM host compute server fails, a copy of the newly written data survives on the at least one storage node.

25. The system of claim 1, wherein generating a full stripe of data that includes the write data further comprise the VM host compute server computing at least one erasure coded block for the full stripe of data.

26. The data storage system of claim 1 wherein the memory configured such that data stored therein is not lost is NVRAM.

27. The data storage system of claim 1 wherein writing the full stripe of data comprises writing the full stripe of data across storage devices of multiple of the plurality of storage nodes.

28. A method comprising:
hosting, on a VM host compute server, at least one guest VM with access to at least one virtual disk (vDisk);
wherein the VM host compute server is coupled, through a network, directly to a plurality of storage nodes;
wherein the VM host compute server comprises at least one server-side cache that is available to each of the at least one guest VMs;
wherein each storage node, of the plurality of storage nodes, comprises:
one or more storage devices,
a central processing unit (CPU), and
a memory configured such that data stored therein is not lost in the case of power failure;
in response to a write operation performed by the at least one guest VM to the at least one vDisk, the VM host compute server causing write data to be written at least three times;
wherein causing write data to be written at least three times includes:
before a triggering event occurs:
writing the write data to the memory, of at least one of plurality of storage nodes, that is configured such that data stored therein is not lost in the case of power failure; and
writing the write data to the at least one server-side cache;
after the triggering event occurs:
generating a full stripe of data that includes the write data; and
writing the full stripe of data to distribute the full stripe of data across storage devices of one or more of the plurality of storage nodes;
wherein the triggering event is that the VM host compute server has accumulated sufficient write data, which has not yet been written in a full stripe, to generate a full stripe of data.

29. The method of claim 28, further comprising, in a case of failure of a component of a particular storage node that includes a portion of the full stripe of data, reconstructing missing data that corresponds to the portion of the full stripe by reading redundant data from one or more surviving storage nodes, of the plurality of storage nodes.

30. The method of claim 29, wherein the component that fails is a CPU and no data storage devices in the particular storage node are accessible.

31. The method of claim 29, wherein the redundant data comprises a plurality of mirrored copies.

32. The method of claim 29, wherein the redundant data comprises a plurality of erasure coded blocks.

33. The method of claim 32, wherein the redundant data comprises at least one of parity blocks, Reed-Solomon coded blocks, and Huffman encoded blocks.

34. The method of claim 28, wherein causing write data to be written at least three times is performed by a driver executing on the VM host compute server.

35. The method of claim 28, wherein causing write data to be written at least three times is performed by a worker VM executing on the VM host compute server.

36. The method of claim 28, wherein causing write data to be written at least three times is performed by a user-level process executing on the VM host compute server.

37. The method of claim 28, further comprising the VM host compute server performing background storage management functions for vDisks, wherein the functions comprise at least one of:
disk reconstructing;
data scrubbing;
data verification;
garbage collection;

data rebalancing; and
data migration.

38. The method of claim 28, wherein each of a plurality of VM host compute servers cooperates with other VM hosts to perform background storage management functions for vDisks, wherein the functions comprise at least one of:
disk reconstructing;
data scrubbing;
data verification;
garbage collection;
data rebalancing; and
data migration.

39. The method of claim 28, wherein the at least one VM host compute server executes a plurality of hosted VMs, each of which is associated with a vDisk, wherein each of the VMs is configured to reconstruct the data for its associated vDisk.

40. The method of claim 28, wherein at least one storage device is local to the at least one VM host compute server and is accessible for caching data used by the guest VMs and their associated vDisks.

41. The method of claim 40, wherein the at least one server-side cache comprises a solid state drive (SSD) device.

42. The method of claim 40, wherein the at least one server-side cache comprises a Flash memory device.

43. The method of claim 40, wherein the at least one server-side cache comprises a phase-change random access memory (PRAM) device.

44. The method of claim 28, wherein the at least one guest VM is associated with the at least one vDisk, and wherein the method further comprises autonomously reconstructing data on a failed storage node within the associated vDisk without communication to other VM hosts.

45. The method of claim 28, further comprising each VM host compute server writing to disjoint sets of physical stripes based on a data layout scheme.

46. The method of claim 45, further comprising allowing read access by other VM host compute servers to data written by one VM host compute server to storage node locations not writable by the other VM host compute servers.

47. The method of claim 45, further comprising migrating the at least one guest VM to a different VM host compute server and providing the at least one guest VM access to its associated vDisk from the different VM host compute server.

48. The method of claim 28, wherein each of the plurality of storage nodes comprises non-volatile random access memory (NVRAM) for accepting Write data with low latency.

49. The method of claim 48, further comprising storing new Write data to the NVRAM of at least one storage node such that if there is a power failure, a copy of the new Write data survives.

50. The method of claim 48, further comprising storing new Write data to the NVRAM of at least two storage nodes such that if one node fails there is a redundant copy of the new Write data.

51. The method of claim 28, further comprising storing new Write data for at least one vDisk to at least one storage node so that if the VM host compute server fails, a copy of the newly written data survives on the at least one storage node.

52. The method of claim 28, wherein generating a full stripe of data that includes the write data further comprise the VM host compute server computing at least one erasure coded block for the full stripe of data.

53. The method of claim 28 wherein the memory configured such that data stored therein is not lost is NVRAM.

54. The method of claim 28 wherein writing the full stripe of data comprises writing the full stripe of data across storage devices of multiple of the plurality of storage nodes.

* * * * *